(12) United States Patent
Gustavsson et al.

(10) Patent No.: US 9,820,243 B2
(45) Date of Patent: Nov. 14, 2017

(54) USING A SUBFRAME TIME OFFSET WHEN SCHEDULING DOWNLINK DATA TRANSMISSIONS

(75) Inventors: Roberth Gustavsson, Stockholm (SE); Jacob Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1134 days.

(21) Appl. No.: 13/395,129

(22) PCT Filed: Sep. 14, 2009

(86) PCT No.: PCT/SE2009/051018
§ 371 (c)(1),
(2), (4) Date: Mar. 9, 2012

(87) PCT Pub. No.: WO2011/031200
PCT Pub. Date: Mar. 17, 2011

(65) Prior Publication Data
US 2012/0170498 A1    Jul. 5, 2012

(51) Int. Cl.
*H04W 72/04* (2009.01)
*H04W 52/40* (2009.01)
*H04W 52/02* (2009.01)

(52) U.S. Cl.
CPC ....... *H04W 52/40* (2013.01); *H04W 52/0206* (2013.01); *Y02B 60/50* (2013.01)

(58) Field of Classification Search
CPC .................................................. H04B 7/2687
See application file for complete search history.

(56) References Cited

U.S. PATENT DOCUMENTS

2007/0024357 A1    2/2007 Plymale et al.
2007/0165677 A1*   7/2007 Monnerat et al. ............ 370/509
(Continued)

OTHER PUBLICATIONS

Seo, IEEE, An efficeient capacity allocation scheme of periodic polling services for a multimedia traffic in an IEEE 802.16 system, 2006, pp. 11-20.*
(Continued)

*Primary Examiner* — Kouroush Mohebbi
(74) *Attorney, Agent, or Firm* — Murphy, Bilak & Homiller, PLLC (57) ABSTRACT

The invention relates to a method in a radio base station for scheduling data transmissions to a user equipment in a first cell. The radio base station is comprised in a telecommunications network comprising at least the first cell and a second cell wherein the radio base station serves at least the first cell. A transmission time of the first cell is divided into a first radio frame comprising a first number of subframes synchronized to a clock. A transmission time of the second cell is divided into a second radio frame comprising an equal number of subframes of equal time length as the first radio frame. The second radio frame is being synchronized to the same clock as the first radio frame. The radio base station receives a first data transmission to be transmitted the user equipment in the first cell, schedules the first data transmission to a minimum of subframes of a first radio frame of the first cell, and transmits the first radio frame offset in time in relation to a second radio frame of the second cell for minimizing simultaneously data transmissions within the cells.

19 Claims, 11 Drawing Sheets

(56) References Cited

U.S. PATENT DOCUMENTS

2008/0102881 A1  5/2008 Han et al.
2009/0252075 A1* 10/2009 Ji et al. .......................... 370/312
2010/0002603 A1* 1/2010 Gupta et al. .................. 370/254

OTHER PUBLICATIONS

3rd Generation Partnership Project. "Coordinated Multi-Point Downlink Transmission in LTE-Advanced." 3GPP TSG-RAN WG1 #55, R1-084400, Prague, Czech Republic, Nov. 10-15, 2008.
3rd Generation Partnership Project. "CQI-RS for LTE-Advanced." 3GPP TSG-RAN WG1 Meeting #56bis, R1-091221, Seoul, Korea, Mar. 23-27, 2009.

* cited by examiner

USING A SUBFRAME TIME OFFSET WHEN SCHEDULING DOWNLINK DATA TRANSMISSIONS

TECHNICAL FIELD

The present invention relates to a method, a system, and a radio base station in a telecommunications network. In particular the invention is for transmitting data transmissions to a user equipment within the telecommunications network.

BACKGROUND

In today's cellular telecommunications systems, there are constant a growing desire to reduce the power consumption of the so called Radio Access Network (RAN).

A large part of the power consumption in a RAN lies in the controlling nodes of the cells in the systems, nodes which are referred to by different names in systems of different standards, but which are sometimes referred to generically as Radio base stations (RBS), or merely as radio base stations. In Wideband Code Division Multiple Access (WCDMA) systems, for example, RBSs are referred to as NodeB, and in Long Term Evolution (LTE) systems, RBSs are referred to as eNodeB.

However, regardless of the name and the system, a primary function of an RBS is that all traffic to and from users in a cell is routed via the RBS, which at least in part accounts for the large amounts of power consumed by an RBS.

In LTE and WCDMA systems, the RBS also has the function of scheduling transmissions to and from the user terminals in a cell, a function which is usually performed by a so called Media Access Control (MAC) scheduler in the RBS.

Of the components in an RBS, a major power consumer is the so called Power Amplifier, the PA. Current demands for high peak data rates, for example, at the borders of the cells require the PAs in the radio base stations to have a high output power capability. A drawback of this is that the PA in most RBSs is over dimensioned for most normal operating scenarios and also consumes more power than necessary.

SUMMARY

An object of embodiments herein is to provide a mechanism to transmit data transmissions from a radio base station with reduced power consumption in a reliable and efficient manner.

According to a first aspect, the object is achieved by a method in a radio base station. The method is for transmitting data transmissions to a user equipment in a first cell. The radio base station is comprised in a telecommunications network comprising at least the first cell and a second cell wherein the radio base station serves at least the first cell. A transmission time of the first cell is divided into a first radio frame comprising a first number of subframes synchronised to a clock. A transmission time of the second cell is divided into a second radio frame comprising an equal number of subframes of equal time length as the first radio frame. The second radio frame is being synchronised to the same clock as the first radio frame.

The radio base station receives a first data transmission to be transmitted the user equipment in the first cell, and schedules the first data transmission to a minimum of subframes of a first radio frame of the first cell. The radio base station then transmits the first radio frame offset in time in relation to a second radio frame of the second cell for minimizing simultaneously data transmissions within the first cell and the second cell.

A basic concept of embodiments herein is to have the different cells to compress the data into subframes transmitted at different times. This will give better power consumption, as parts of the radio base station may go into micro sleep when subframes are empty, with a better interference situation and, if placed cleverly, smoother power draws.

In order to perform the method an arrangement in the radio base station is provided. The arrangement comprises a receiving unit arranged to receive a first data transmission to be transmitted to the user equipment. The arrangement further comprises a scheduler arranged to schedule the first data transmission to a minimum of subframes of a first radio frame of the first cell. In addition, the arrangement comprises a transmitting unit arranged to transmit the first radio frame offset in time in relation to a second radio frame of the second cell for minimizing simultaneously data transmissions within the cells.

Furthermore, a system is provided comprising a first radio base station comprising the arrangement above and a second radio base station synchronised to the same clock as the first radio base station. The second radio base station is arranged to serve the second cell. The first radio base station is arranged to receive an indication of the transmission time of the radio frame in the second cell of the second radio base station. The first radio base station is further arranged to schedule the radio frame in the first cell offset in time in relation to the received indication for minimizing simultaneously data transmissions within the first cell and the second cell. This will give reduced power consumption with a better interference situation.

BRIEF DESCRIPTION OF THE DRAWINGS

Embodiments will now be described in more detail in relation to the enclosed drawings, in which.

DETAILED DESCRIPTION

Figure 1:
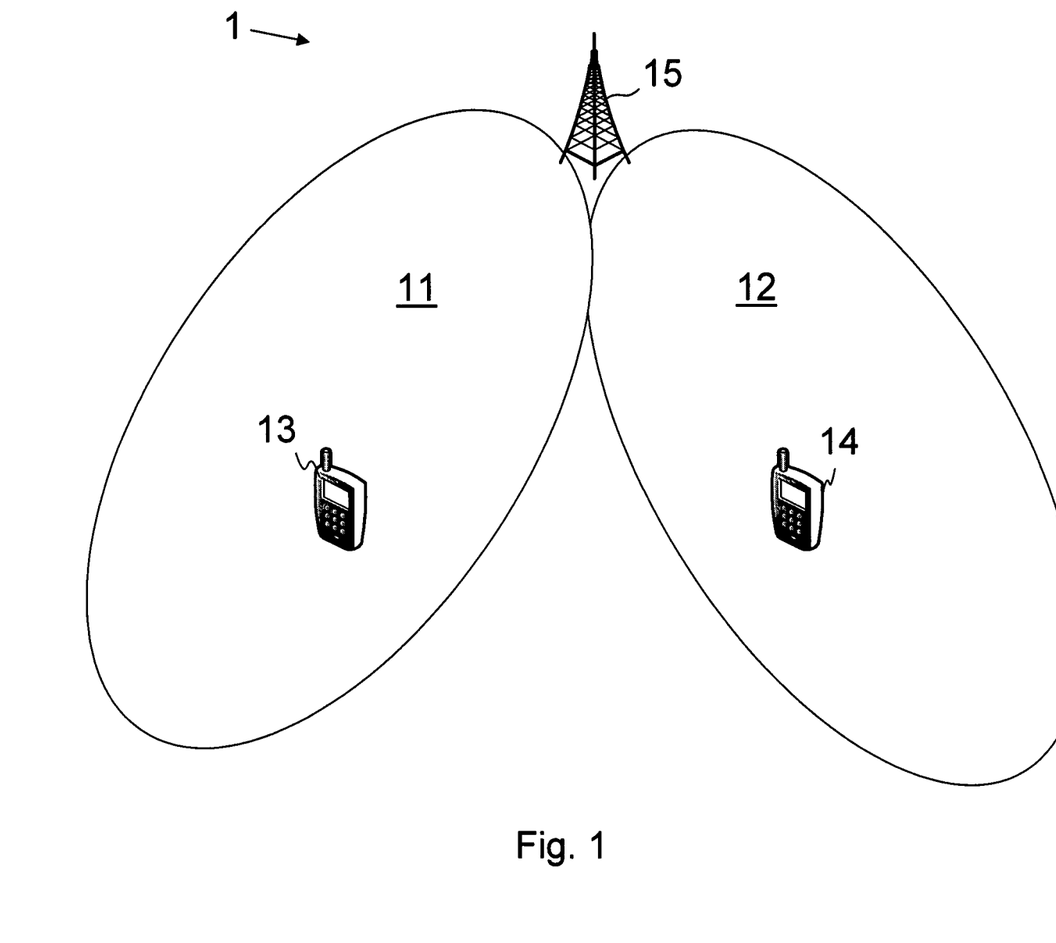
FIG. 1 is a schematic diagram showing a telecommunications network.

FIG. 1 shows an example of a telecommunications network 1 in which the present invention is suitably applied. As shown, the telecommunications network 1 is a cellular system and comprises a number of cells, two of which is shown as a first cell 11 and a second cell 12 in FIG. 1. Each cell may comprise a number of user terminals, with the generic name "UE", User Equipment, two of which are shown as a first UE 13 and a second UE 14 in FIG. 1.

For each cell in the telecommunications network 1, there is a controlling node, generically referred to as a "radio base station", RBS, which is shown as 15 in FIG. 1. One role of the RBS 15 is that all traffic to and from the UEs 13 and 14 in the cells 11 and 12 is routed via the RBS 15. The telecommunications network may comprise an LTE network as well as to other networks using subframes. An RBS may be denoted as NodeB or eNodeB in some of the networks.

Since all traffic to and from the user equipments 13 and 14 in the cells 11 and 12 is routed via the RBS 15, the RBS 15 will be a major consumer of power or energy in the telecommunications network 1. As stated above, one purpose of the present solution is to achieve a reduction in the power consumed by the RBS 15. Herein it is disclosed a way of reducing the power consumed by a power amplifier (PA) of a transmitting unit in the RBS 15, since the PA is a major consumer of power within the RBS 15.

To save power consumption on a single transmitting radio of the RBS 15, a scheduler in the RBS 15 tries to shape the traffic to optimize the power consumption of a single transmitting radio. The best way is to compress the traffic into as few subframes as possible, to get as many "empty" subframes as possible. In the "empty" subframes, the transmitting radio may be put in micro-sleep, that is, short time intervals where the transmitting radio is powered down.

If each cell 11, 12 in the RBS 15 uses a different allocation scheme, the interference between the cells of the RBS 15 will be reduced and the spectrum efficiency will be improved. Also fewer power peaks will occur, because the allocation scheme prevents the scenario where as all transmitting radios within the RBS 15 go from micro sleep to potentially full power on within a few microseconds. Thus, major pulses are avoided on the power network, which, unless filtered properly, would destroy the backup batteries.

In the present solution the RBS 15 first receives user data, within at least one of the cells 11, 12 and compresses the data into different subframes. The RBS 15 then delays the transmission of a radio frame of the first cell 11 relative a radio frame of the other cell 12. This will give better interference situation and, if placed cleverly, smoother power consumption. Hence, the second cell 12 is a neighboring cell to the first cell 11 meaning that the second cell is in a range of the first cell that may cause data transmissions in the second cell to interfere with data transmission in the first cell. The same applies to cells of neighboring cells of different RBSs.

Figure 2:
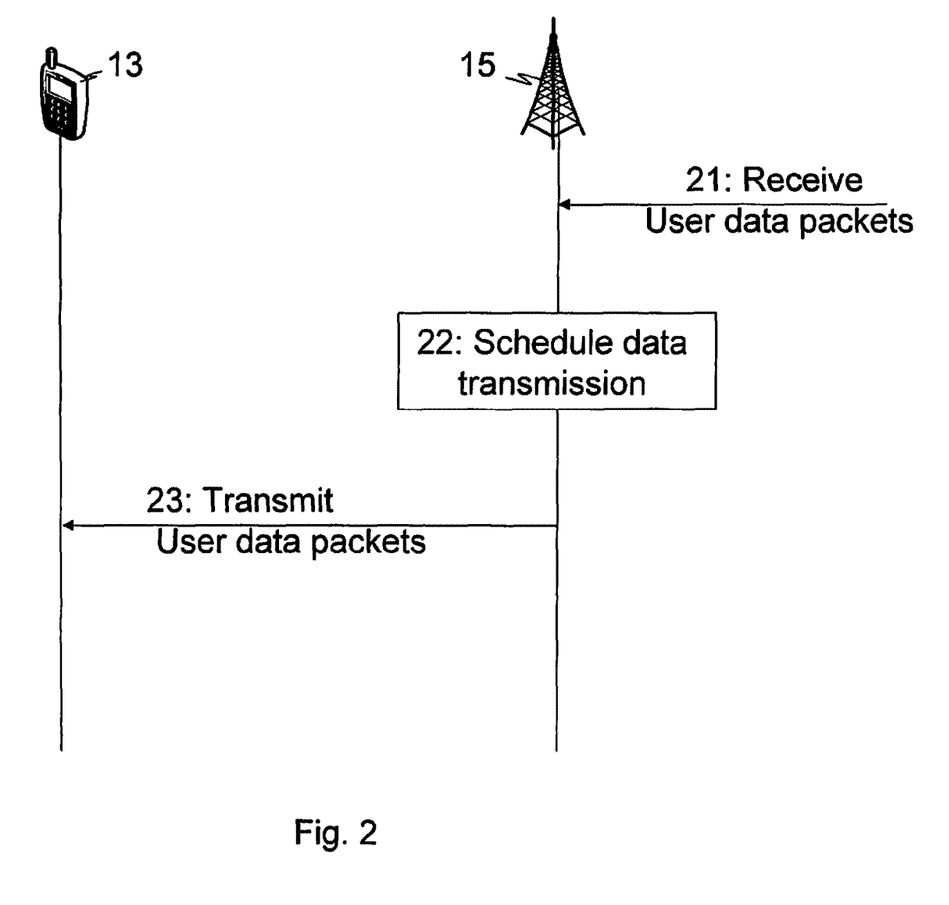
FIG. 2 is a combined flowchart and signaling scheme depicting embodiments of the telecommunications network.

FIG. 2 is a combined signaling scheme and flowchart depicting embodiments of the present solution. The steps do not have to be taken in the order stated below, but may be taken in any suitable order. In the illustrated embodiment, the RBS 15 serves two cells or sectors. However, the RBS 15 may serve merely one, three or more than three cells.

In step 21, the RBS 15 receives user data packets intended for the user equipment 13, that is, a data transmission to be transmitted to the UE 13. It should here be noted the RBS 15 may collect data to be transmitted to different user equipments of different cells served by the RBS 15.

In step 22, the RBS 15 schedules the data transmissions by compressing the data transmissions to as few subframes as possible in order to get as many "empty" subframes as possible. In the "empty" subframes, the radio may be put in micro-sleep and hence save power consumption of the RBS 15. As reference signals, cell defining information, such as a synchronization signals is comprised in the first and the sixth subframe of the radio frame, the RBS 15 first fills these subframes. These subframes are denoted as subframe numbers 0 and 5 as disclosed below.

It should here be noted that the RBS 15 instead of merely transmitting the received data in the next subframe may collect the received data over a time period, for example, 5-10 ms, compress the received data, and fill subframes with the data. Thus, a delay in the transmission may be introduced.

The RBS 15 may select the subframes to be filled with data transmissions according to a preset allocation scheme. For example, the RBS 15 may compress the data according to an allocation scheme stating that the RBS 15 compresses first the data transmission into subframe number 0. When the subframe number 0 is full the RBS 15 compresses the data transmission into subframe number 5, then subframe number 2, subframe number 7, and so on. However, the allocation scheme may change depending on the load of data transmissions within a cell. Hence, the RBS 15 may first determine the load in one or all of the cells served by the RBS 15. Then, based on the highest determined load in the cells of the RBS 15, the RBS 15 selects an allocation scheme. Hence, the RBS 15 may comprise a number of allocation schemes and select one based on the determined load.

The RBS 15 may allocate the data transmissions in the first cell as well as data transmissions in the second cell to a minimum of subframes.

In order to avoid that the data transmissions are sent simultaneously in the first and second cell, the RBS 15 in step 23 offsets the transmission time of the subframes of the different cells relative one another. Offsetting means that the RBS 15 transmits the radio frame of the first cell at a different time relative the radio frame of the second cell. This may be controlled by the scheduler in the RBS 15. Hence, smoother power consumption is obtained as described below.

Figure 3:
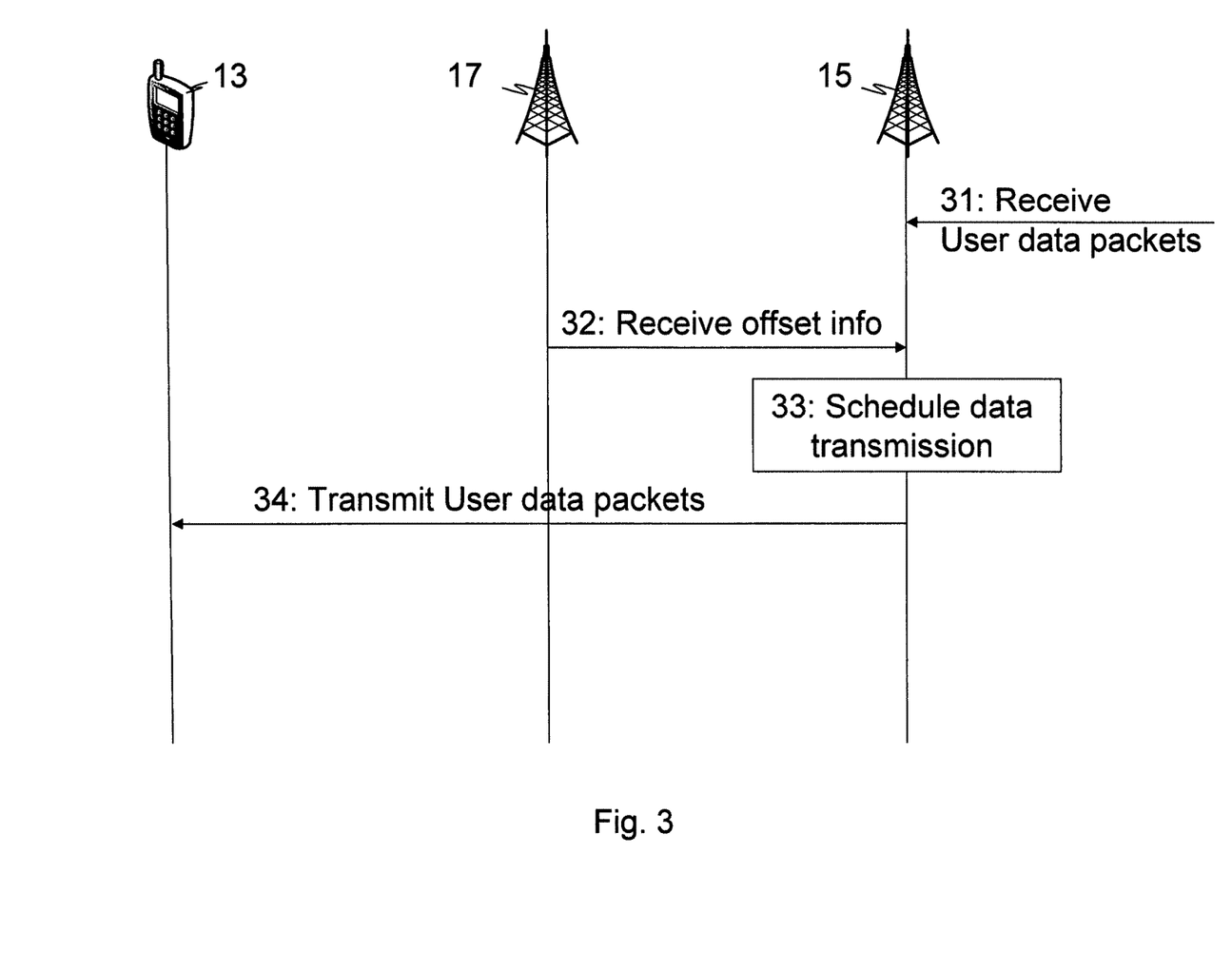
FIG. 3 is a combined flowchart and signaling scheme depicting embodiments of the telecommunications network.

FIG. 3 is a combined signaling scheme and flowchart depicting further embodiments of the present solution. The steps do not have to be taken in the order stated below, but may be taken in any suitable order. In the illustrated example, the RBS 15 takes into account, when deciding when to transmit the radio frame in the first cell, the transmission time of a neighboring cell served by a second RBS 17. The RBSs 15 and 17 may here serve a single or a plurality of cells. In this example the RBS 15 is denoted as the first RBS 15.

In step 31, the first RBS 15 receives data to be transmitted to the UE 13. Step 31 in FIG. 3 corresponds to the step 21 in FIG. 2.

In step 32, the first RBS 15 receives an offset information of the transmission time in a neighboring cell of the second RBS 17. The information is transmitted from the second RBS 17 to the first RBS 15. For example, the second RBS 17 may indicate a transmission time offset 0 ms, 1 ms, or 2 ms. This information may be transmitted on request from the first RBS 15, or periodically transmitted, for example, on the X2 interface in LTE. The second RBS 17 schedules data transmissions to a radio frame within a cell served by the second RBS 17. The radio frame may be offset to a clock, such as a Global Positioning System (GPS) clock, used to synchronize the transmissions of radio frames of the first RBS 15 and the second RBS 17.

In step 33, the first RBS 15 schedules the data transmissions by compressing the data transmissions to as few subframes as possible in order to get as many "empty" subframes as possible. Step 33 in FIG. 3 corresponds to the step 22 in FIG. 2.

In step 34, the first RBS 15 offsets the transmission of the radio frame in the first cell in relation to the received offset information to minimize overlap. Thereby, the data transmissions in the first cell will be sent in a subframe offset to the data transmissions in the neighboring cell of the second RBS 17. Thereby the inference of the data transmission in the cells is reduced.

It should here be understood that this offset of transmission may be controlled by a central entity such as an Operation and Maintenance (O&M) node, a Location Monitoring Unit or the like. The O&M node may then transmit the synchronizing time, wherein the synchronizing time is based on the same clock but offset in the O&M node for the different cells. That is, the O&M node may transmit a wanted time offset of T for a first cell, a time offset T+one subframe, 1 ms, for a second cell and time offset T+two subframes for a third cell.

Figure 4:
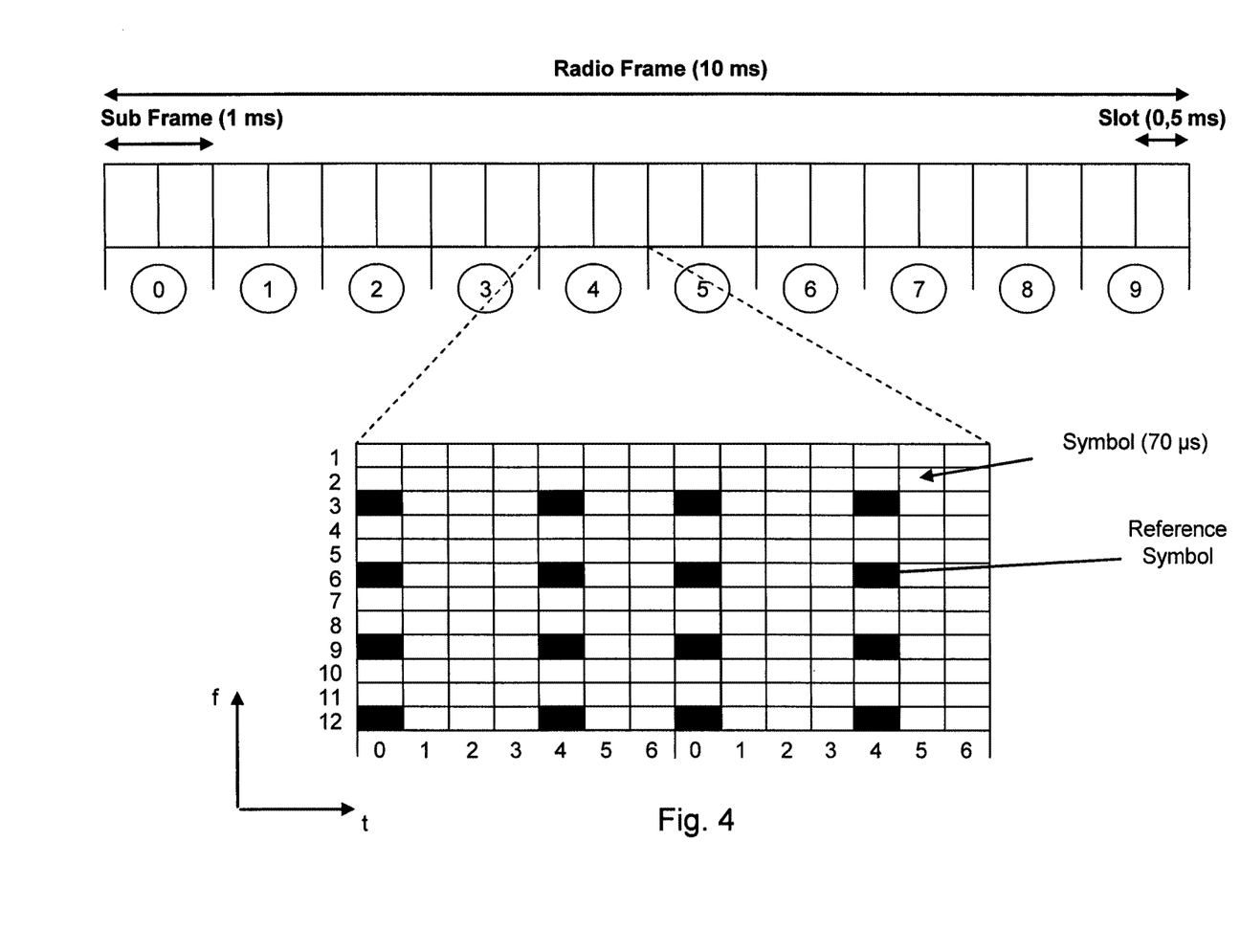
FIG. 4 is a schematic diagram showing a schematic overview of a radio frame.

In FIG. 4 a frame structure of a radio frame is shown. In the illustrated example a radio frame of a Long Term Evolution network is shown. The radio frame of 10 ms comprises ten subframes referred to as 0-9 of 1 ms each, wherein each subframe comprises of two time slots of 0.5 ms. Subframe 0 and subframe 5 contain cell-defining information, such as synchronization and broadcast signaling. The other subframes may be used to transmit reference symbols used for channel estimation by the UE 13, but may also be empty of information. Minimum subframe 9 and 4 should be transmitted in order to properly decode the cell-defining information.

FIG. 4 also shows Reference Signals (RS) presence within a Physical Resource Block (PRB). Each subframe consist of up to 100 Physical Resource Blocks, each of 12 OFDM carriers, frequency (f) 1-12, and 14 symbols of two time slots, time (t) 0-6 and 0-6, of 1 ms/14=70 μs.

The RBS 15 may fill the subframes 0 and 5 first as these contains cell defining information. When the RBS 15 serves three cells, the RBS 15 fills the subframes 0 and 5 of each cell with data transmissions and in order to avoid overlap of transmission the RBS 15 transmits the radio frame of each cell at different times. That means that the transmission synchronization is offset with 1 subframe, e.g. 1 ms, for each cell.

However, after the RBS 15 allocates the data transmissions to the first and sixth subframe, the RBS 15 may allocate data transmissions of the different cells to different subframes. The allocation may be performed according to an allocation scheme arranged to, for example, minimize overlap of subframes comprising data transmissions, even out the power changes of transmission power between the subframes, and/or the like.

It should here be understood that the RBS 15 may allocate the data transmission initially to other subframes than the subframe 0 and subframe 5 if other subframes are filled with data.

By compressing data to as few subframes as possible in a Down Link (DL) direction the power for transmitting in the RBS 15 is reduced. This may be done in a Radio Equipment Controller (REC; CPRI terminology) by a Media Access Control (MAC)-scheduler comprised in the RBS 15. At low traffic, all traffic is concentrated to one subframe. DL retransmissions are also delayed to fit the structure, e.g. retransmission is done 10 ms later.

The MAC-scheduler sends information to a Radio Equipment (RE), transmitting unit, regarding the output power per symbol for each subframe. The RE may then decide when there are symbols periods without power, and may enter a micro sleep mode, a low power mode.

Figure 5:
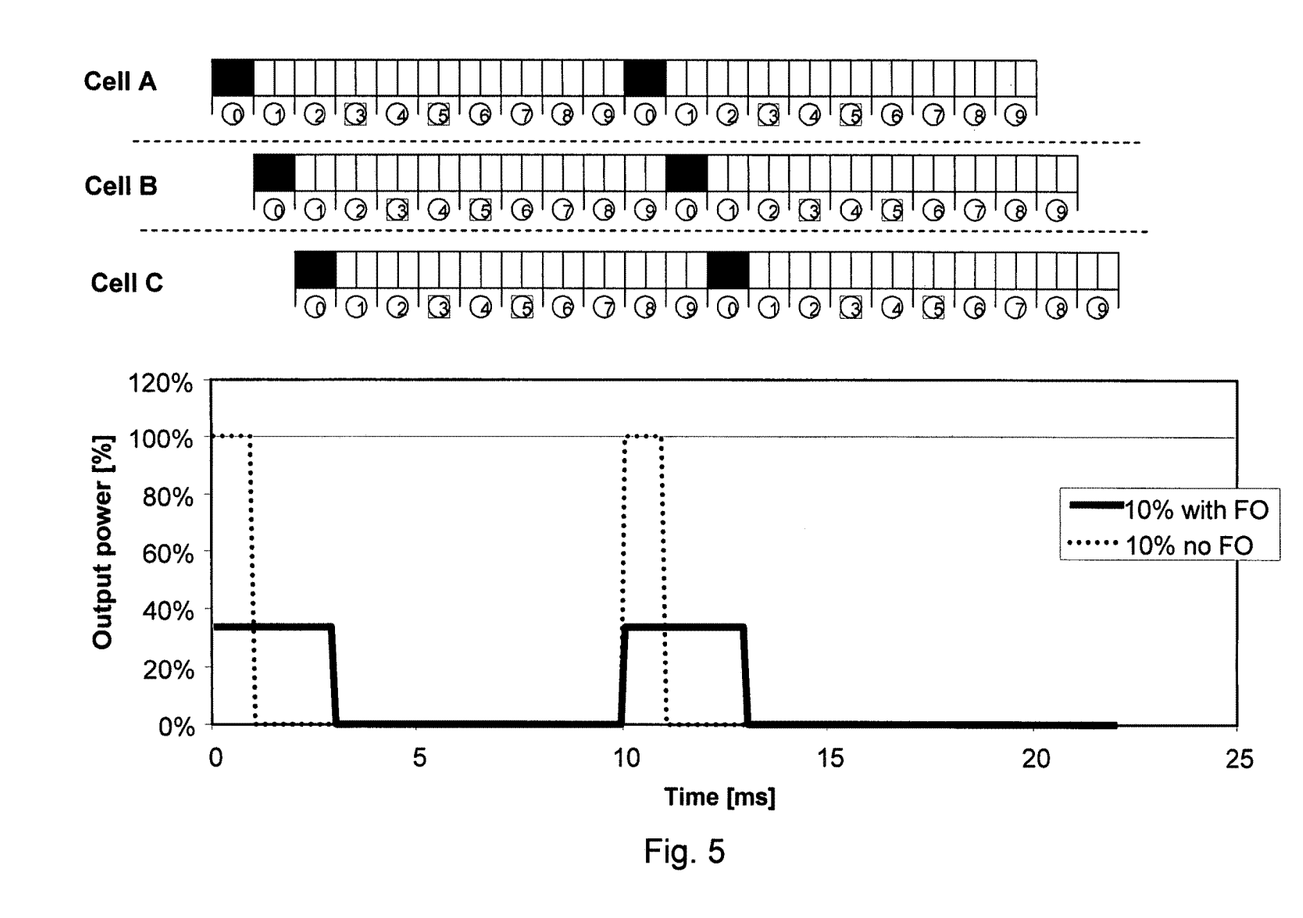
FIG. 5 is a schematic diagram showing an allocation of data transmissions in cells with a load of 10%.

FIG. 5 shows the traffic allocation over the frame for 10% load. In the illustrated example the RBS 15 serves three cells, cell A, cell B, and cell C. Two radio frames of each cell are illustrated comprising subframes 0-9. FIG. 5 shows both what SubFrames (SFs) that are filled with data, referred to as darkened subframes in FIG. 5, and also the resulting power consumption of the RBS 15 in a graph. The y-axis in the graph defines the output power in percentage relative systems of today and the x-axis represents the time in ms. Dotted line is without Frame Offset (FO), and the full line is with FO. In systems with no FO, the power ramping is instantaneous from 0 to full output power, resulting in high ripple in the power system as indicated by the dotted line. Using FO with 10% load, the ramps are never more than 33% of the max consumption. It should here be noted that in the illustrated examples the load is the same in the different cells, whereas the load may be different in the different cells. Furthermore, power used for transmitting the cell defining information in SF 5 is not shown.

Figure 6:
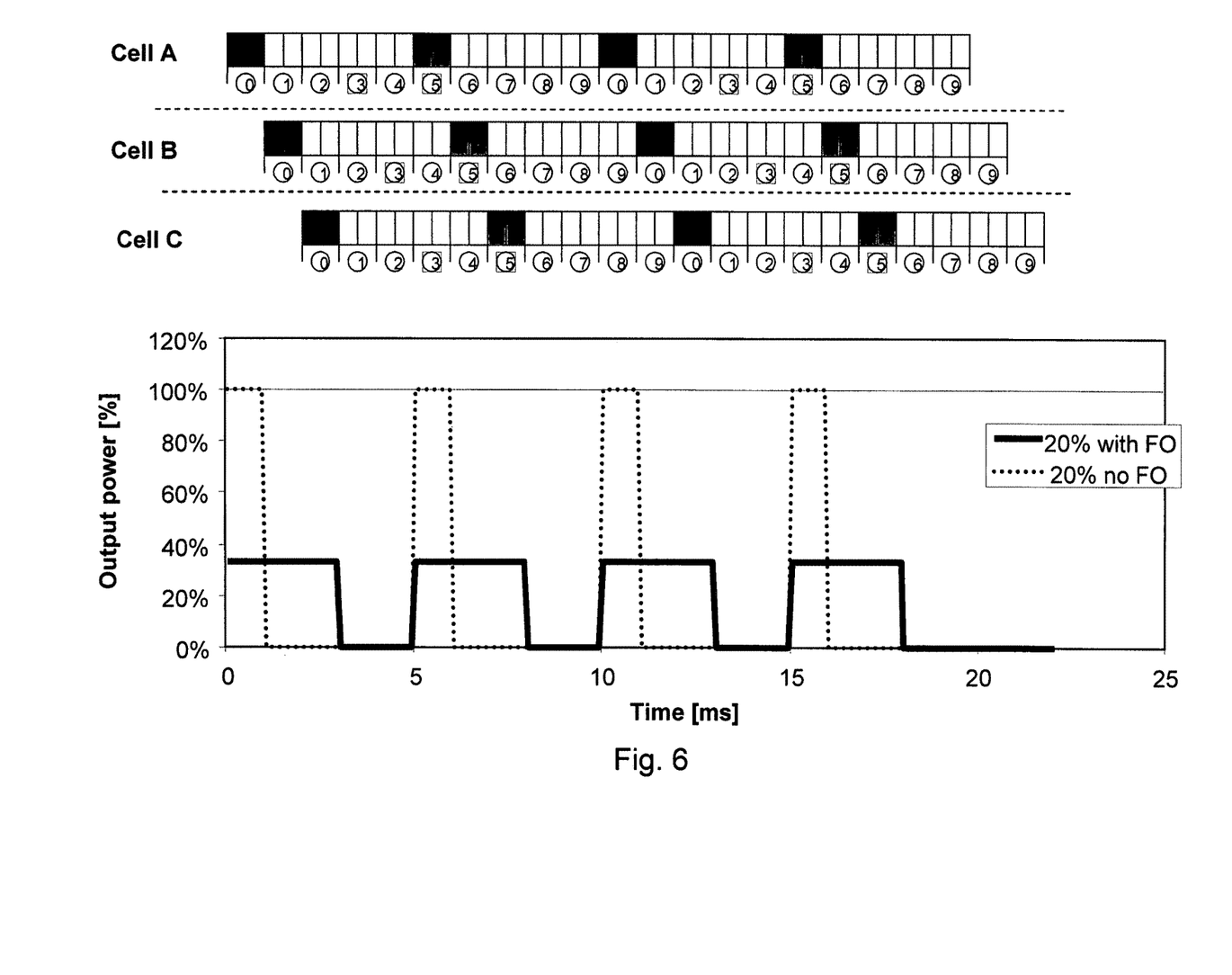
FIG. 6 is a schematic diagram showing an allocation of data transmissions in cells with a load of 20%.

FIG. 6 shows the traffic allocation over the radio frame for 20% load resulting in that two subframes may be filled. In the illustrated example the RBS 15 serves three cells, cell A, cell B, and cell C. Two radio frames of each cell are illustrated comprising subframes 0-9. FIG. 6 shows both which SubFrames (SFs) that are filled with data, referred to as darkened subframes in FIG. 6, and also the resulting power consumption of the RBS 15 in a graph. The y-axis in the graph defines the output power in percentage relative systems of today and the x-axis represents the time in ms. Dotted line is without the Frame Offset (FO), and the full line is with FO. The graph illustrates an even power consumption of 33% whereas systems with no FO shows power ramping of 0 to 100% four times within 16 ms.

Figure 7:
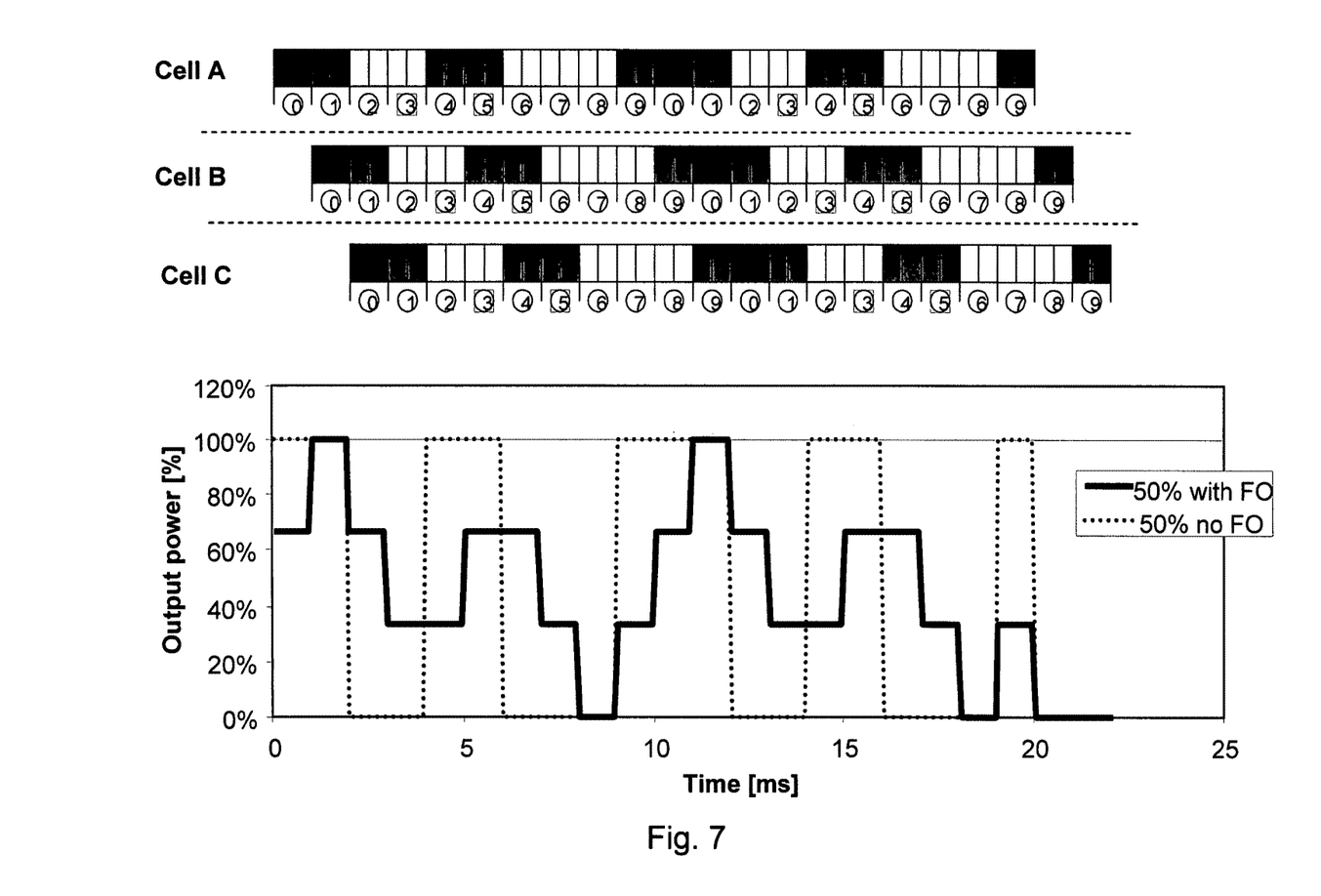
FIG. 7 is a schematic diagram showing an allocation of data transmissions in cells with a load of 50%.

FIG. 7 shows the traffic allocation over the radio frame for 50% load. When traffic is higher than 20%, at least a third subframe needs to be used. In the illustrated example the RBS 15 serves three cells, cell A, cell B, and cell C. Two radio frames of each cell are illustrated comprising subframes 0-9. FIG. 7 shows both which SubFrames (SFs) that are filled with data, referred to as darkened subframes in FIG. 7, and also the resulting power consumption of the RBS 15 in a graph. The y-axis in the graph defines the output power in percentage relative systems of today and the x-axis represents the time in ms. Dotted line is without the Frame Offset (FO), and the full line is with FO. The RBS may have different strategies for where this traffic, data transmissions, is placed, between the sectors, to minimize the number of subframes likely to have overlapping traffic. One proposal is to have cell A allocate traffic in the following order: SF: 0,5,4,9,1,6,7,2,3,8 and the cell B and cell C follow the same SF order.

Figure 8:
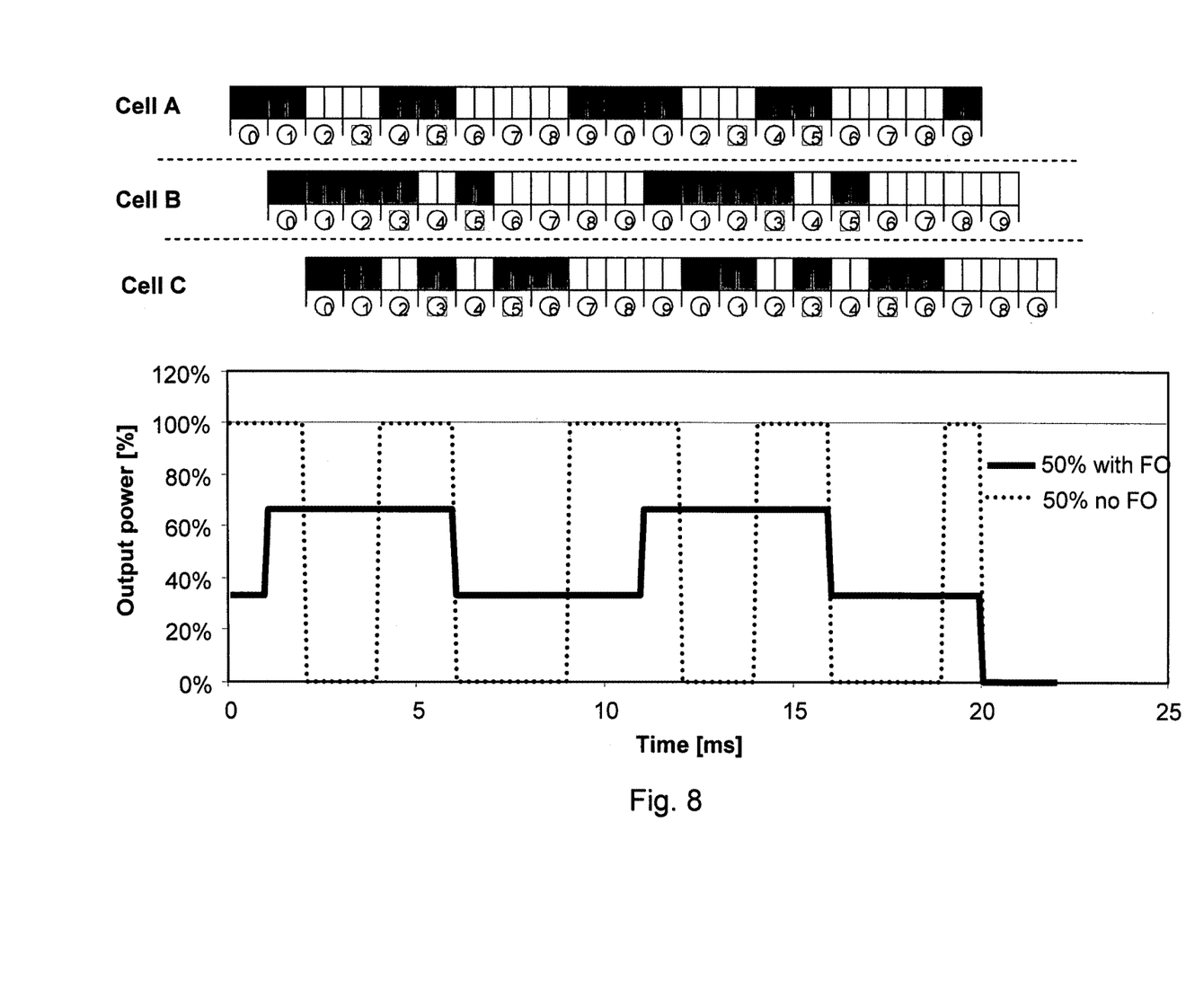
FIG. 8 is a schematic diagram showing a dynamic allocation of data transmissions in cells with a load of 50%.

FIG. 8 shows power ramping at 50% traffic load. In the illustrated example the RBS 15 serves three cells, cell A, cell B, and cell C. Two radio frames of each cell are illustrated comprising subframes 0-9. FIG. 8 shows both which SubFrames (SFs) that are filled with data, referred to as darkened subframes in FIG. 8, and also the resulting power consumption of the RBS 15 in a graph. The y-axis in the graph defines the output power in percentage relative systems of today and the x-axis represents the time in ms. Dotted line is without the Frame Offset (FO), and the full line is with both aspects of a solution. Note that FIG. 7 above shows the case with only one aspect, that is, to minimize overlap, implemented. FIG. 8 shows that the power consumption is evened out, with fewer ramps and with less top consumption. Hence, in the illustrated example the interference is reduced as well as power surges. In the illustrated example, the RBS 15 allocates in cell A in the following order: SF: 0,5,4,9,1,6,7,2,3,8; cell B in SF: 0,5,2,3,1,8,7,9, 6,4 and cell C in SF 0,5,6,3,1,8,7,6,4,2. This is shown in FIG. 8. Another example may be to allocate in cell A in the following order: SF: 0,5,4,9,6,7,8,1,2,3 in cell B SF: 0,5,4, 1,9,8,7,3,6,2; in cell C SF: 0,5,8,1,9,2,7,3,4,6.

The different cells of the RBS 15 are given different allocation strategies to improve the interference situation. The strategies are so arranged that the first subframe used for traffic do not collide in time between the cells. The second subframe allocated for traffic only partly collides in time with subframes of the different cells.

To also decrease the power fluctuations in the power system, the allocations strategies are arranged so that the traffic in different cells are adjacent in time. This may be performed by using an offset of a number of whole subframes between the cells. One proposal is to delay cell A 0 SF, cell B 1 SF and cell C 2 SF. This is shown in FIGS. 5, 6, 7 and 8.

The scheduler may then delay and collect transmissions to have them coincide with the transmission subframes for the cell-defining data, and may turn off parts of the radio equipment in the RBS 15 during other subframes.

In some embodiments, the scheduler offsets the time for transmission of cell-defining data between cells in the RBS 15, to improve interference, that is, reduce interference, and to reduce the need for filtering in the power system.

As illustrated in FIG. 8, the RBS 15 may use different allocation schemes of traffic for different cells within the RBS 15, to improve interference and to reduce need for filtering in the power system. Hence, the concentration of traffic in a few subframes gives large power saves, for example, at low loads and that this gives an improved interference situation at low load, which result in less retransmissions and thus further lower power consumption.

In a radio base station serving a plurality of cells, the radio base station comprises a plurality of transmitting radios. A problem that may arise is that all transmitting radios may transmit the first symbol of the subframe. The transmitting radios that have an "empty" subframe may only transmit a little power in the first symbol but will exit a micro sleep mode just before transmitting and this may cause a power ramp/ripple. To further decrease the power ripple at a first OFDM symbol of a subframe, the different transmitting radios may be informed of different end times for the micro sleep. For instance, a transmitting radio which is to send a subframe containing data may exit micro sleep 5 micro seconds before the transmission of the first OFDM symbol of that subframe. A power pulse then attenuates in time for other transmitting radios of other cells to ramp up for their transmission of the first OFDM symbol. Alternatively, each transmitting radio may be given a configured offset in the order of a few micro seconds to offset the micro sleep exit time. The SF start time is still the same for all cells to accomplish a synchronized network, which enables multi-cast features such as Multi-Media Broadcast over a Single Frequency Network (MBSFN).

Figure 9:
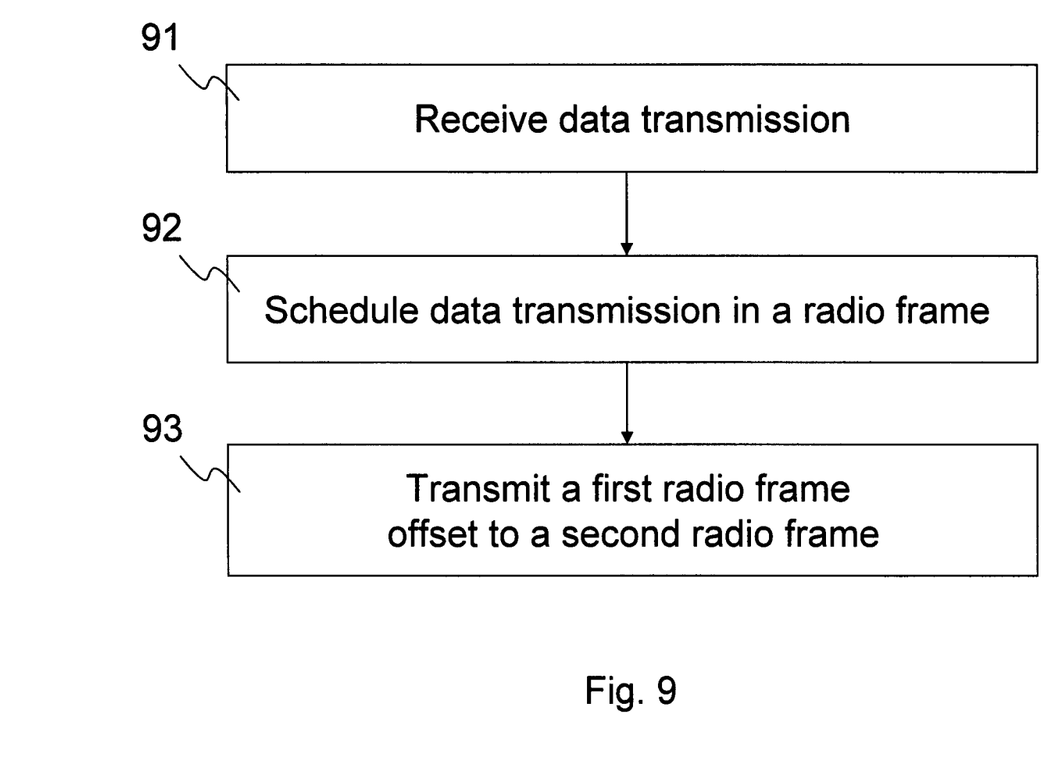
FIG. 9 is a schematic diagram showing embodiments of a method in a radio base station in a telecommunications network.

The method steps in the radio base station, referred to as radio base station 15 in the figures, for transmitting data transmissions to the user equipment 13 in the first cell 11 according to some general embodiments will now be described with reference to a flowchart depicted in FIG. 9.

The steps do not have to be taken in the order stated below, but may be taken in any suitable order. The radio base station 15 is comprised in the telecommunications network 1 comprising at least the first cell and the second cell 12 wherein the radio base station 15 serves at least the first cell 11. A transmission time of the first cell 11 is divided into a first radio frame comprising a first number of subframes synchronised to a clock, such as a GPS or a network clock, and a transmission time of the second cell 12 is divided into a second radio frame. The second radio frame comprises an equal number of subframes of equal time length as the first radio frame and being synchronised to the same clock as the first radio frame.

In step 91, the radio base station 15 receives a first data transmission to be transmitted to the user equipment 13 in the first cell 11.

In step 92, the radio base station 15 schedules the first data transmission to a minimum of subframes of a first radio frame of the first cell 11.

In step 93, the radio base station 15 transmits the first radio frame offset in time in relation to a second radio frame of the second cell 12 for minimizing simultaneously data transmissions within the first and second cells 11, 12.

Figure 10:
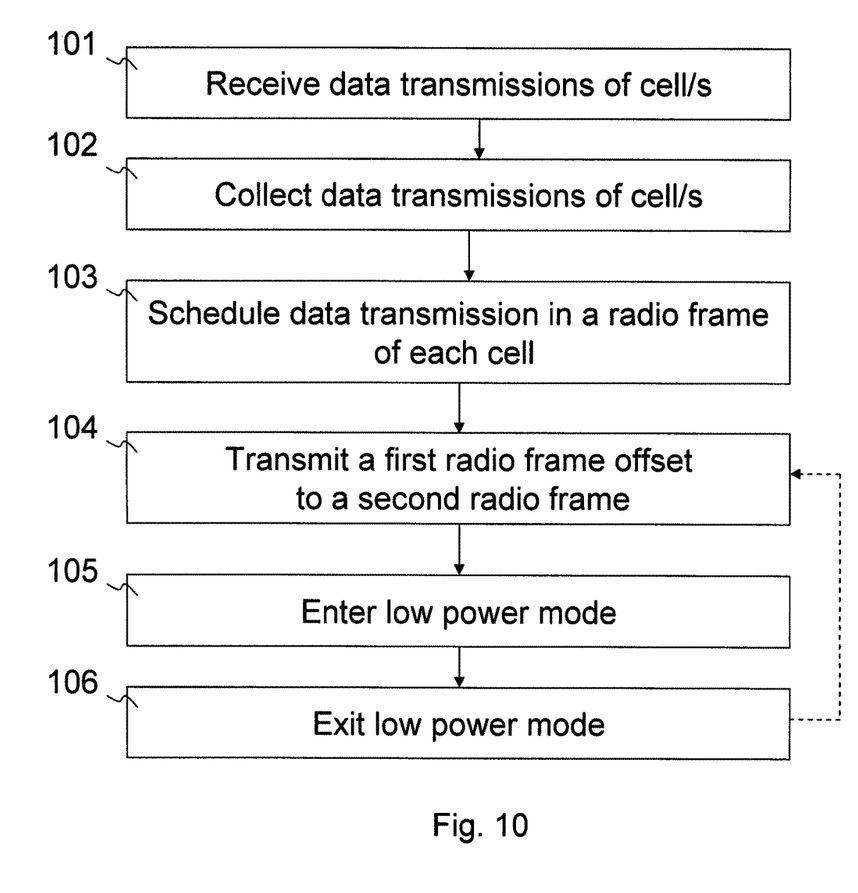
FIG. 10 is a schematic diagram showing further embodiments of a method in a radio base station in a telecommunications network.

The method steps in the radio base station 15 for transmitting data transmissions to the user equipment 13 in the first cell 11 according to some further embodiments will now be described with reference to a flowchart depicted in FIG. 10. The steps do not have to be taken in the order stated below, but may be taken in any suitable order.

In step 101, the radio base station 15 receives a first data transmission to be transmitted to the user equipment 13 in the first cell 11 and may also receive a second data transmission to be transmitted within the first cell 11.

In optional step 102, the radio base station 15 collects the first and second data transmissions over a period of time.

In step 103, the radio base station 15 schedules the first data transmission to a minimum of subframes of a first radio frame of the first cell 11. This may, in some embodiments wherein the radio base station 15 has collected first and second data transmissions, be performed by compressing the collected data transmissions to as few subframes as possible. For example, subframes may be consecutively filled with data transmission in a certain order.

In optional embodiments, the radio base station 15 also serves the second cell 12 with an ongoing third data transmission and the radio base station 15 also collects the third data transmission in the second cell 12 over a period of time. The radio base station 15 then schedules the data transmissions in the second cell 12 to a minimum of subframes of the radio frame of the second cell 12 by compressing the collected data transmission to as few subframes as possible.

It should also be understood that the radio base station 15 may also determine load of the collected data transmissions within the first and/or second cell 11, 12 and then the scheduling of the data transmissions in the first cell 11 is based on the determined load.

The scheduling of the data transmission to the minimum of subframes of the radio frame of the first and/or second cell 11, 12 may follow an allocation scheme arranging the data transmissions to minimize simultaneously data transmissions within the cells. The allocation scheme may further be constructed to arrange the data transmissions to minimize the transmission power changes between subframes within the radio frame. The allocation scheme may define that the radio base station 15 first schedules and compresses the data transmission to a subframe of the first radio frame comprising cell defining information, for example, in subframe number 0 or 5.

The allocation scheme may be preset at the radio base station 15. It should also be noted that if the radio base station 15 has determined load in the first and/or second cell 11, 12 the allocation scheme may be based on the determined load.

In step 104, the radio base station 15 transmits the first radio frame offset in time in relation to a radio frame of the second cell 12 for minimizing simultaneously data transmissions within the cells 11, 12. The offset in time may be defined as subframes, whole subframes. In embodiments, wherein the second cell is served by the second radio base station 17 the step of transmitting the first radio frame offset in time is based on a time offset of a radio frame in the second radio base station 17. The time offset is received from the second radio base station 17. This may be requested from the radio base station 15, being the first radio base station, or sent periodically. The time offset may also be received from an O&M node.

In step 105, the first radio base station 15 may enter a low power mode of a first cell 11 during at least one subframe that does not comprise a scheduled data transmission.

In step 106, the first radio base station 15 may exit the low power mode offset in time in relation to a low power mode of the second cell 12. For example, a transmitting radio of the first cell 11 in the radio base station 15 goes out of its micro sleep and prepares for transmission offset in time to a transmitting radio of the second cell 12 of the radio base station 15. This offset may be on sub-symbol level. The radio base station 15 may then transmit a first radio frame again as indicated with the dashed arrow.

Figure 11:
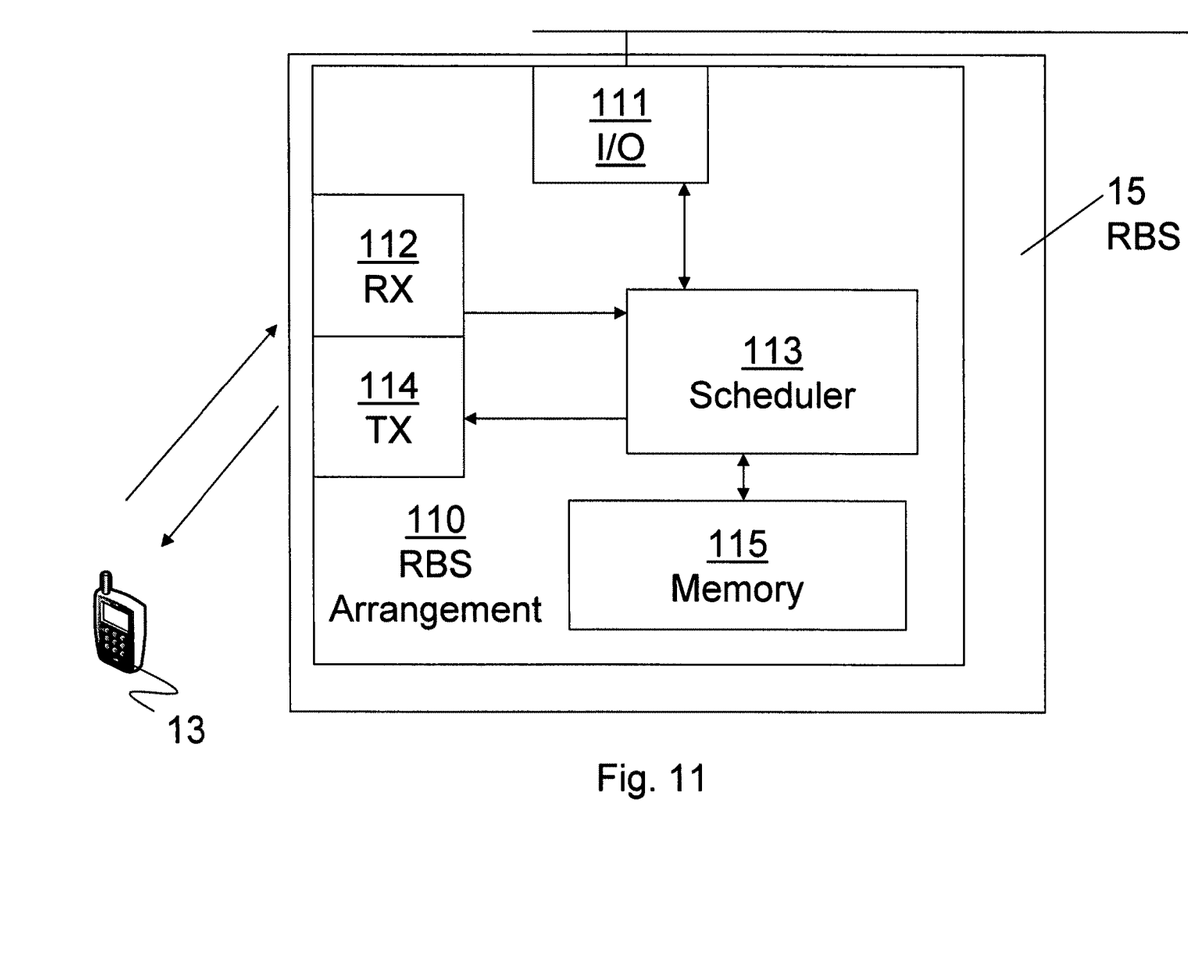
FIG. 11 is a schematic block diagram overview of a radio base station.

In FIG. 11, an arrangement 110 in the radio base station 15 is disclosed. The arrangement comprises a receiving unit 111, such as a network interface I/O, arranged to receive a first data transmission to be transmitted to the user equipment 13. The data transmission may also be received locally within the first cell 11 over a local receiving device RX 112, such as an antenna arrangement.

The arrangement 110 further comprises a scheduler 113 arranged to schedule the first data transmission to a minimum of subframes of a first radio frame of the first cell 11. The scheduler may sends information to a Radio Equipment (RE) comprising a transmitting unit 114 regarding the output power per symbol for each subframe. The RE may then decide when there are symbols periods without power, and can enter a micro sleep mode.

The transmitting unit 114 is arranged to transmit the first radio frame offset in time in relation to a second radio frame of the second cell for minimizing simultaneously data transmissions within the cells. This may be controlled by the scheduler 113. The transmitting unit 114 may comprise a power amplifier (PA) and by herein it is disclosed a way of reducing the power consumed by the PA in the radio base station 15.

The arrangement 110 may further comprise a memory unit 115 to be used to store data regarding, for example, data transmissions, transmission times, offset time of own cell/s and neighboring cell/s, different allocation schemes and applications to perform the methods of this solution.

The memory unit 115 may comprise a single memory unit, a plurality of memory units, external and/or internal memory units.

It should here be noted that in accordance with FIG. 3, a system comprising a first radio base station 15 comprising the arrangement 110 and second radio base station 17 synchronised to the same clock as the first radio base station 15 is herein disclosed. The second radio base station 17 is arranged to serve the second cell 12. The first radio base station 15 is arranged to receive an indication of the transmission time of the radio frame in the second cell 12 of the second radio base station 17. The first radio base station 15 is further arranged to schedule the radio frame in the first cell 11 offset in time in relation to the received indication for minimizing simultaneously data transmissions of the radio base station 15 within the first and second cells 11, 12.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio base station serving a first cell in a telecommunication network, said method comprising:
   receiving user data for transmission to one or more users in the first cell;
   scheduling the user data for transmission to the one or more users in subframes of a first radio frame, by compressing the user data into as few subframes as possible within the first radio frame, so that the first radio frame has as many empty subframes as possible; and
   transmitting the first radio frame offset in time relative to a second radio frame transmitted in a neighboring second cell to thereby minimize simultaneous data transmissions in the first and second cells, wherein the second radio frame has the same number of subframes as the first radio frame and is synchronized to a clock that is also used for the first radio frame.

2. The method of claim 1, wherein receiving the user data includes delaying user data transmissions as needed, to collect user data received by the radio base station over a defined time period, and wherein scheduling the user data for transmission comprises compressing the collected user data into as few subframes as possible within the first radio frame.

3. The method of claim 2, wherein receiving the user data includes receiving first user data and second user data and wherein the collected data includes the first and second user data.

4. The method of claim 1, further comprising compressing the user data into as few subframes as possible according to at least one of: an allocation scheme that first fills subframes that are also used for transmitting cell defining information; and an allocation scheme that dynamically varies according to cell loading in at least one of the first and second cells.

5. The method of claim 1, further comprising determining a data transmission load within at least one of the first and second cells, and wherein the scheduling of the user data for transmission in the first cell is based on the determined load.

6. The method of claim 1, wherein the radio base station also serves the second cell and wherein, for user data to be transmitted in the second cell, the method includes the user data for the second cell over a period of time, and, as part of scheduling the transmission of the user data in the second cell, the radio base station compresses the data to be transmitted in the second cell to as few subframes as possible in a radio frame of the second cell.

7. The method of claim 1, wherein a process for scheduling data transmission in at least one of the first and second cells follows an allocation scheme arranging the data transmissions to minimize simultaneous data transmissions within the first cell and the second cell.

8. The method of claim 7, wherein the allocation scheme further arranges the data transmissions to minimize the transmission power changes between subframes within radio frames.

9. The method of claim 7, wherein the allocation scheme defines that the radio base station first schedules and compresses data transmissions to subframes in radio frames comprising cell defining information.

10. The method of claim 7, wherein the allocation scheme is preset at the radio base station.

11. The method of claim 1, wherein the second cell is served by a second radio base station and wherein the step of transmitting the first radio frame offset in time is based on a time offset of a radio frame in the second radio base station received from the second radio base station.

12. The method of claim 1, wherein the step of transmitting the first radio frame offset in time is based a time offset received from an Operation and Management node.

13. The method of claim 1, wherein the offset in time is defined in terms of subframes.

14. The method of claim 1, further comprising
entering a low power mode during at least one subframe that does not comprise a scheduled data transmission.

15. The method of claim 14, comprising
exiting the low power mode offset in time in relation to a low power mode of the second cell.

16. An apparatus for use in a radio base station configured to serve a first cell in a telecommunication network, said apparatus comprising:
a receiving unit configured to receive user data for transmission to one or more users in the first cell; and
a transmitting unit configured to:
schedule the user data for transmission to the one or more users in subframes of a first radio frame, by compressing the user data into as few subframes as possible within the first radio frame, so that the first radio frame has as many empty subframes as possible; and
transmit the first radio frame offset in time relative to a second radio frame transmitted in a neighboring second cell to thereby minimize simultaneous data transmissions in the first and second cells, wherein the second radio frame has the same number of subframes as the first radio frame and is synchronized to a clock that is used for the first radio frame.

17. The apparatus of claim 16, wherein the apparatus is configured to delay user data transmissions as needed, to collect user data received by the radio base station over a defined time period, and to schedule the user data for transmission by compressing the collected user data into a few subframes as possible within the first radio frame.

18. The apparatus of claim 16, wherein the apparatus is configured to compress the user data into as few subframes as possible according to at least one of: an allocation scheme that first fills subframes that are also used for transmitting cell defining information; and an allocation scheme that dynamically varies according to cell loading in at least one of the first and second cells.

19. A system comprising:
first and second radio base stations in a telecommunications network, wherein the first and second radio base stations are arranged to serve first and second cells, respectively, wherein a transmission time of the first cell is divided into a first radio frame comprising a first number of subframes synchronised to a clock and a transmission time of the second cell is divided into a second radio frame comprising an equal number of subframes of equal time length as the first radio frame and being synchronised to the same clock as the first radio frame;
wherein said first radio base station comprises a receiving unit configured to receive user data for transmission to one or more users in the first cell, and further comprises a transmitting unit configured to:
schedule the user data for transmission to the one or more users in subframes of a first radio frame, including compressing the user data into as few subframes as possible within the first radio frame, so that the first radio frame has as many empty subframes as possible; and
transmit the first radio frame offset in time relative to a second radio frame transmitted in the second cell, to thereby minimize simultaneous data transmissions in the first and second cells, wherein the second radio frame has the same number of subframes as the first radio frame and is synchronized to the same clock as used for the first radio frame; and
wherein the first radio base station is further configured to receive from the second base station an indication of the offset in time of the second radio frame relative to the first radio frame.

* * * * *